June 19, 1956
M. L. NADLER ET AL
2,751,416
CONTINUOUS PROCESS FOR THE MANUFACTURE
OF THIURAM DISULFIDES
Filed Aug. 20, 1953
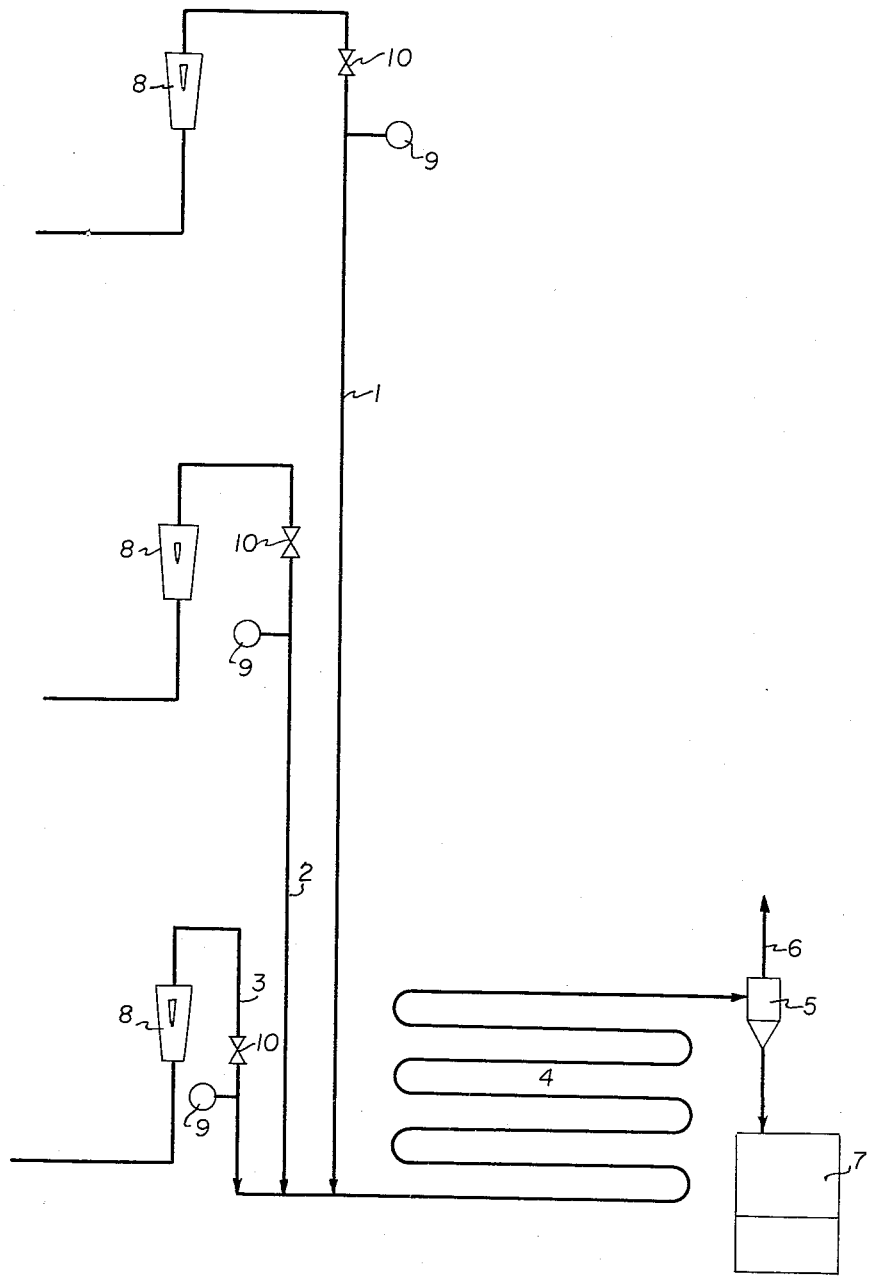
INVENTORS
MARTIN L. NADLER and
WILLIAM E. MEECE
BY Cullen S. Frey
ATTORNEY

2,751,416

CONTINUOUS PROCESS FOR THE MANUFACTURE OF THIURAM DISULFIDES

Martin L. Nadler, Wilmington, and William E. Meece, New Castle, Del., assignors to E. I. du Pont de Nemours & Company, Wilmington, Del., a corporation of Delaware Application August 20, 1953, Serial No. 375,441

6 Claims. (Cl. 260—567)

This invention relates to a continuous process for the manufacture of disulfides, and more particularly to the manufacture of tetramethyl thiuram disulfide by the oxidation of sodium dimethyl dithiocarbamate with chlorine.

Tetramethyl thiuram disulfide has heretofore been prepared by oxidizing sodium dimethyl dithiocarbamate with chlorine or other oxidizing agents such as hydrogen peroxide. Where chlorine is used in the usual batch process, difficulties are experienced, as more particularly pointed out in U. S. Patent No. 2,375,083 to Cooper which is directed more particularly to a method of introducing the chlorine in the atmosphere above the surface of the aqueous medium to be oxidized, and preferably with the addition of sodium carbonate, borax or sodium hydroxide. The expedients employed by Cooper add materially to the operating difficulties and cost of carrying out the reaction, since the method of introducing the chlorine materially increases the reaction time and requires large reaction equipment.

Tetramethyl thiuram disulfide has been found to be of particular value in the elastomer art, more particularly as a vulcanization accelerator and as a sulfur-containing compound useful in the manufacture of polychloroprene. It has also been found to have powerful biological activity and is used as an agricultural fungicide and as a bacteriostatic agent in soaps. The uses to which it is now put require large volume production, making it desirable to devise a method whereby it can be made continuously, as distinguished from the batch processes heretofore disclosed.

It is an object of this invention to provide a continuous process for the manufacture of tetramethyl thiuram disulfide which is simple and economical to operate and which will produce the tetramethyl thiuram disulfide in good yields and of high purity.

According to the present invention, tetramethyl thiuram disulfide may be conveniently, rapidly and cheaply produced in high yields and purity by carrying out the oxidation of the sodium dimethyl ditchiocarbamate with chlorine diluted with air or other inert gas by continually passing the reactants at a relatively high rate of speed through a turbannular flow tube in which the oxidizing gas is brought in intimate contact with the sodium dimethyl dithiocarbamate under conditions which result in a minimum of side reactions, thereby giving relatively pure products.

The attached drawing, which forms a part of this specification, shows digramatically a process for carrying out this invention. In the drawing the sodium dimethyl dithiocarbamate, air and chlorine are fed through lines 1, 2 and 3, respectively, into a turbannular flow tube 4 which discharges the gases and the aqeuous suspension of the resulting tetramethyl thiuram disulfide in a cyclone separator 5 from which the gases are separated and passed upward through 6 to a gas scrubbing system. The liquid suspension of the teramethyl thiuram disulfide flows from the bottom of the cyclone separator to storage 7 or directly to filters, as desired. The feed lines for the sodium dimethyl dithiocarbamate, air and chlorine are equipped with flow meters 8, pressure gauges 9 and valves 10 so that the flow of the liquids and gases may be determined and controlled.

The turbannular flow tube 4 is preferably made of glass to prevent undue side reactions or contamination of the resulting tetramethyl thiuram disulfide, although other inert materials may of course be employed.

The recation is preferably carried out at a final temperature of not over 60° C. Although the reaction is exothermic, the temperature may be controlled by cooling the reactants prior to their introduction into the turbannular flow tube to temperatures of 20° C. or below.

The following example is given to illustrate the invention, it being understood that many variations may be made in the details given without departing from the spirit of the invention.

Example

Into a glass reaction tube having a dimeter of 0.5 inch and a length of approximately 68 feet, chlorine is fed at the rate of 6.6 pounds per hour, mixed with air which is fed into the tube at a rate of 53 pounds per hour. A 15.5% aqueous solution of sodium dimethyl dithiocarbamate is fed into the gas stream in the tube at a rate of 150.2 pounds per hour, this rate of feed being equivalent to 23.2 pounds of sodium salt per hour. This rate of feed of the gases and the solution of the sodium dimethyl dithiocarbamate produces turbannular flow through the tube with a pressure drop of from 31 pounds per square inch to atmospheric pressure. The inlet temperature of the liquid is 9° C., while the outlet temperature under these conditions of operation is 43° C. The sodium dimethyl dithiocarbamate is fed into the tube at pH of about 8, while the pH of the aqueous suspension of the tetramethyl thiuram disulfide at the outlet is approximately 1. The liquid suspension of the tetramethyl thiuram disulfide containing sodium chloride and hydrochloric acid is separated from the gas, filtered and the filter cake washed at a temperature of from 50° to 80° C. with water, and dried. This gives a pure, white, substantially odorless product having a melting point of 149° C. The yield based on the sodium dimethyl dithiocarbamate is 96%.

Similar results have been obtained when the turbannular flow tube is only 40 feet long and also where the tube is 120 feet long. These lengths are not given as maximum or minimum since the length of the tube will depend on the diameter and the pressure drop employed. The diameter and length of the tube may of course be varied within reasonable limits, so long as the tube is large enough not to clog under normal operations, and it may be as large as desired so long as the required pressure drop is obtainable. Pressure drops varying from 10 to 35 pounds have been found to be satisfactory, although even lower pressure drops may be used where the length of the tube is materially decreased. It is known that the reaction is completed in 12 feet of one-half inch tube. It is possible that tubes less than 12 feet long, with resulting low pressure drops, may be used. A preferred diameter of tube for use with pressure drops of from 10 to 35 pounds is from 1.5 inches to 3 inches.

The dithiocarbamate fed to the reactor should preferably be between a 15% and 17% solution. Other concentrations are operable but those above 17% give slurries of tetramethyl thiuram disulfide which are ordinarily inconveniently thick, while those below 15% are increasingly less economical to use, because of the larger equipment required for the same rate of disulfide production.

The pH of the feed solution of sodium dimethyl dithiocarbamate should be between 7 and 10 for best results. More alkaline solutions use more chlorine and tend to give less pure products under the conditions herein disclosed. The low pH may be obtained by addition of acid, for example, acetic, or by avoiding an excess of sodium hydroxide in the process of making the dithiocarbamate.

The ratio of air to chlorine should be greater than 10:1, and preferably between about 15:1 and 25:1 by volume. With too great a concentration of chlorine, both yield and quality decrease. Greater dilutions of chlorine give a slower reaction and, partly because of the larger gas volumes, require larger equipment for the same yield of product. Instead of air, other inert gases such as nitrogen, carbon dioxide, or even oxygen may be used.

An excess of chlorine over that theoretically required to react with the sodium dimethyl dithiocarbamate is not essential, although an excess of 10% to 35% is often desirable to take care of fluctuations in the feed of the dithiocarbamate and give a greater driving force for the reaction. Larger excesses of chlorine while operable merely add to the cost of the process and when too large an excess is used some decomposition of the intermediate or resulting product takes place.

The temperature of the reaction should ordinarily be below 60° C. throughout. The lower limit is set by the freezing point of the sodium dimethyl dithiocarbamate solution. Hence, the operating temperatures will usually be above 0° C. The reaction temperature may be kept below the maximum temperature desired either by starting with a cold solution, that is, below 20° C., or by cooling the reactor externally either by jacketing the tube or with a water spray.

The slurry will usually be filtered at from 0° C. to 60° C. to reduce corrosion on the filter. The cake may be washed with water at a temperature of 0° C. to 100° C., and preferably at from 30° to 80° C. Drying may be performed at any temperature below about 120° C.

The gaseous and liquid reactants are passed through the tube reactor at a velocity great enough to give turbannular flow. That is, the liquid phase assumes the form of an annular stream flowing along the walls of the tube and the gas flows through the center of the tube in the passage formed by the annular stream of liquid which is violently agitated and at the same time driven forward by the rapidly flowing gas stream. The critical velocity above which turbannular flow occurs is readily determined by observation. At materially lower velocities, the so-called slug-flow is produced, in which slugs of liquid filling the entire bore of the tube are formed and the flow is highly irregular and adequate contact between the liquid and gas is not obtained. The upper practical limit of the gas velocity is about 700 feet per second above which serious abrasion of most materials of construction occurs. The dimensions of the reaction tube and the rates of feed therethrough may be widely varied so long as turbannular flow is produced and the contact time is long enough to give complete reaction. The interrelation of tube dimensions, liquid and vapor velocities, pressure gradients, etc., under conditions of turbannular flow, is well known and is discussed, for example, by Lockhart and Martinelli in Chemical Engineering Progress 45, page 39–45 (1949).

The reaction tube and other parts coming in contact with the chlorine are conveniently made of glass or of steel lined with glass or inert ceramic material.

We claim:

1. A continuous process for the manufacture of tetramethyl thiuram disulfide which comprises containing an aqeuous solution of sodium dimethyl dithiocarbamate having an initial pH of from 7 to 10 with chlorine gas diluted with an inert gas under turbannular flow at temperatures of from 0° to 60° C., the ratio of inert gas to chlorine being greater than 10:1 by volume and the amount of chlorine employed being at least that theoretically required to oxidize the sodium dimethyl dithiocarbamate to tetramethyl thiuram disulfide.

2. A continuous process for the manufacture of tetramethyl thiuram disulfide which comprises contacting an aqueous solution of sodium dimethyl dithiocarbamate having an initial pH of from 7 to 10 with chlorine gas diluted with an inert gas under turbannular flow at temperatures of from 0° to 60° C., the ratio of inert gas to chlorine being greater than 10:1 by volume and the amount of chlorine employed being at least that theoretically required to oxidize the sodium dimethyl dithiocarbamate to tetramethyl thiuram disulfide, filtering the resulting aqueous suspension, and washing the filter cake with water at from 50° to 80° C.

3. A continuous process for the manufacture of tetramethyl thiuram disulfide which comprises contacting an aqueous solution of sodium dimethyl dithiocarbamate having an initial pH of from 7 to 10 with chlorine gas diluted with an inert gas under turbannular flow at temperatures of from 0° to 60° C., the ratio of inert gas to chlorine being greater than 10:1 by volume and the amount of chlorine employed being from 10% to 35% in excess of that theoretically required to oxidize the sodium dimethyl dithiocarbamate to the tetramethyl thiuram disulfide.

4. A continuous process for the manufacture of tetramethyl thiuram disulfide which comprises contacting an aqueous solution of sodium dimethyl dithiocarbamate having an initial pH of from 7 to 10 with chlorine gas diluted with an inert gas under turbannular flow at temperatures of from 0° to 60° C., the ratio of inert gas to chlorine being greater than 10:1 by volume and the amount of chlorine employed being from 10% to 35% in excess of that theoretically required to oxidize the sodium dimethyl dithiocarbamate to the tetramethyl thiuram disulfide, filtering the resulting aqueous suspension, and washing the filter cake with water at 50° to 80° C.

5. A continuous process for the manufacture of tetramethyl thiuram disulfide which comprises contacting an aqueous solution of sodium dimethyl dithiocarbamate having an initial pH of from 7 to 10 with chlorine gas diluted with air under turbannular flow at temperatures of from 0° to 60° C., the ratio of air to chlorine being greater than 10:1 by volume and the amount of chlorine employed being at least that theoretically required to oxidize the sodium dimethyl dithiocarbamate to tetramethyl thiuram disulfide.

6. A continuous process for the manufacture of tetramethyl thiuram disulfide which comprises contacting an aqueous solution of sodium dimethyl dithiocarbamate having an initial pH of from 7 to 10 with chlorine gas diluted with air under turbannular flow at temperatures of from 0° to 60° C., the ratio of air to chlorine being greater than 10:1 by volume and the amount of chlorine employed being from 10% to 35% in excess of that theoretically required to oxidize the sodium dimethyl dithiocarbamate to the tetramethyl thiuram disulfide.

References Cited in the file of this patent

UNITED STATES PATENTS

| | | |
|---|---|---|
| 1,782,111 | Adams et al. | Nov. 18, 1930 |
| 1,796,977 | Bailey | Mar. 17, 1931 |
| 2,286,690 | Sibley | June 16, 1942 |
| 2,375,083 | Cooper | May 1, 1945 |